(12) United States Patent
Haque

(10) Patent No.: US 7,882,525 B2
(45) Date of Patent: Feb. 1, 2011

(54) DATA COLLECTION FOR A COMPREHENSIVE PROGRAM GUIDE

(75) Inventor: Shaheedur R. Haque, Acton (GB)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 11/789,021

(22) Filed: Apr. 23, 2007

(65) Prior Publication Data

US 2008/0263593 A1 Oct. 23, 2008

(51) Int. Cl.
H04N 5/445 (2006.01)
(52) U.S. Cl. .......................................... 725/50; 725/46
(58) Field of Classification Search ................... 725/46, 725/50
See application file for complete search history.

(56) References Cited

U.S. PATENT DOCUMENTS

| | | | |
|---|---|---|---|
| 4,992,783 A * | 2/1991 | Zdunek et al. ............. | 340/5.74 |
| 5,579,055 A | 11/1996 | Hamilton et al. | |
| 5,760,821 A | 6/1998 | Ellis et al. | |
| 6,774,926 B1 * | 8/2004 | Ellis et al. ................ | 348/14.01 |
| 2002/0186296 A1 | 12/2002 | Gogoi et al. | |
| 2003/0051246 A1 | 3/2003 | Wilder et al. | |
| 2003/0070170 A1 | 4/2003 | Lennon | |
| 2003/0208760 A1 | 11/2003 | Sugai et al. | |
| 2004/0078807 A1 | 4/2004 | Fries et al. | |
| 2004/0158876 A1 | 8/2004 | Lee | |
| 2006/0010470 A1 | 1/2006 | Kurosaki et al. | |
| 2006/0026643 A1 | 2/2006 | Silverberg et al. | |
| 2006/0064721 A1 | 3/2006 | Del Val et al. | |
| 2006/0161949 A1 | 7/2006 | Tsukamoto | |
| 2008/0046922 A1 * | 2/2008 | Jankins et al. ................ | 725/35 |

FOREIGN PATENT DOCUMENTS

WO WO0219691 A3 3/2002

OTHER PUBLICATIONS

Greco, J., "Data preparation for interactive electronic program guides", Date: Sep. 12-16, 1996, pp. 294-297, http://ieeexplore.ieee.org/xpl/freeabs_all.jsp?arnumber=642906.
Peng et al., "A digital television navigator", http://users.tkk.fi/~pcy/jnavigator_final.pdf.

* cited by examiner

Primary Examiner—Hunter B. Lonsberry
Assistant Examiner—Oschta Montoya

(57) ABSTRACT

Data collection for a comprehensive program guide is described. In embodiment(s), a content distributor communicates media content to client devices via an IP-based network. The client devices also receive off-air media content along with off-air program guide data that corresponds to the off-air media content. The content distributor can then receive the off-air program guide data from any one or more of the client devices to update a comprehensive program guide at the content distributor.

19 Claims, 6 Drawing Sheets

DATA COLLECTION FOR A COMPREHENSIVE PROGRAM GUIDE

BACKGROUND

The variety of television programming and media content sources continues to increase. In addition to scheduled television program broadcasts, television viewing options also include on-demand choices which enable a viewer to search for and request media content for viewing when convenient rather than at a scheduled broadcast time. A viewer can initiate a search for a list of television programming choices in a program guide (also commonly referred to as an electronic program guide or "EPG").

A television system can include hybrid client devices that receive off-air television programming over the air via a broadcast network, and receive on-demand and IPTV programming via an IP-based network (e.g., Ethernet). Program guide data for the on-demand and IPTV programming, as well as for the off-air programming, is typically received from various third-party sources. The program guide data corresponding to the on-demand, IPTV, and off-air programming can then be integrated at a content distributor into a comprehensive programming schedule. The comprehensive programming schedule can then be provided to the hybrid television client devices as a program guide via the IP-based network.

A television programming schedule may change unexpectedly, such as to accommodate a sporting event that exceeds its scheduled program time-slot, or for breaking news coverage of a news event that is broadcast in place of one or several regularly scheduled programs. These types of unannounced programming changes to scheduled television programming can be updated at the hybrid television client devices when the client devices receive off-air program guide data that is received along with the off-air programming broadcast to the client devices. However a television programming schedule change may not be readily updated at the content distributor because an update from the various third-party sources may not be received for several hours. An off-air programming schedule change received by a hybrid television client device may then conflict with the comprehensive programming schedule received from the content distributor.

These and other types of programming conflicts can also impact DVR (digital video recorder) settings at a television client device, such as when a DVR is scheduled to record a program that is pre-empted for a long-running sporting event or a breaking news event. The comprehensive programming schedule may not be updated quickly enough at the content distributor to reflect the programming changes in the off-air television programming. In addition, the DVR client device is then left having to reconcile the comprehensive program guide schedule received from the content distributor with the off-air program guide data received over the air via the broadcast network.

SUMMARY

This summary is provided to introduce simplified concepts of data collection for a comprehensive program guide. The simplified concepts are further described below in the Detailed Description. This summary is not intended to identify essential features of the claimed subject matter, nor is it intended for use in determining the scope of the claimed subject matter.

In embodiment(s) of data collection for a comprehensive program guide, a content distributor communicates media content to client devices via an IP-based network. The client devices also receive off-air media content along with off-air program guide data that corresponds to the off-air media content. The content distributor can then receive the off-air program guide data from any one or more of the client devices to update a comprehensive program guide at the content distributor.

In other embodiment(s), the client devices generate a signature from the off-air program guide data that corresponds to the off-air media content. The signature uniquely identifies a version of the off-air program guide data, and the content distributor can receive the signatures from the client devices along with the off-air program guide data. The content distributor can determine a geographical mapping of the client devices based on the signatures that are received from the client devices. In addition, the content distributor can determine geographic signal characteristics for the client devices from signal data received along with the off-air program guide data.

BRIEF DESCRIPTION OF THE DRAWINGS

Embodiments of data collection for a comprehensive program guide are described with reference to the following drawings. The same numbers are used throughout the drawings to reference like features and components.

DETAILED DESCRIPTION

Embodiments of data collection for a comprehensive program guide provide that television client devices communicate off-air program guide data to a content distributor. The client devices receive IPTV media content from the content distributor via an IP-based network. The client devices can also receive off-air media content along with the off-air program guide data that corresponds to the off-air media content. The client devices can then send the off-air program guide data to the content distributor that incorporates the off-air program guide data into a comprehensive program guide. The comprehensive program guide generated at the content distributor is then up-to-date to reflect the off-air media content schedule at the television client devices, and the content distributor can determine which of the client devices receive different regional channel lineups. Further, a television client device and/or the content distributor can resolve viewer-scheduled recordings that may conflict with a programming schedule change.

While features and concepts of the described systems and methods of data collection for a comprehensive program guide can be implemented in any number of different environments, computing systems, entertainment systems, and/or other various configurations, embodiments of data collection for a comprehensive program guide are described in the context of the following example systems and environments.

Figure 1:
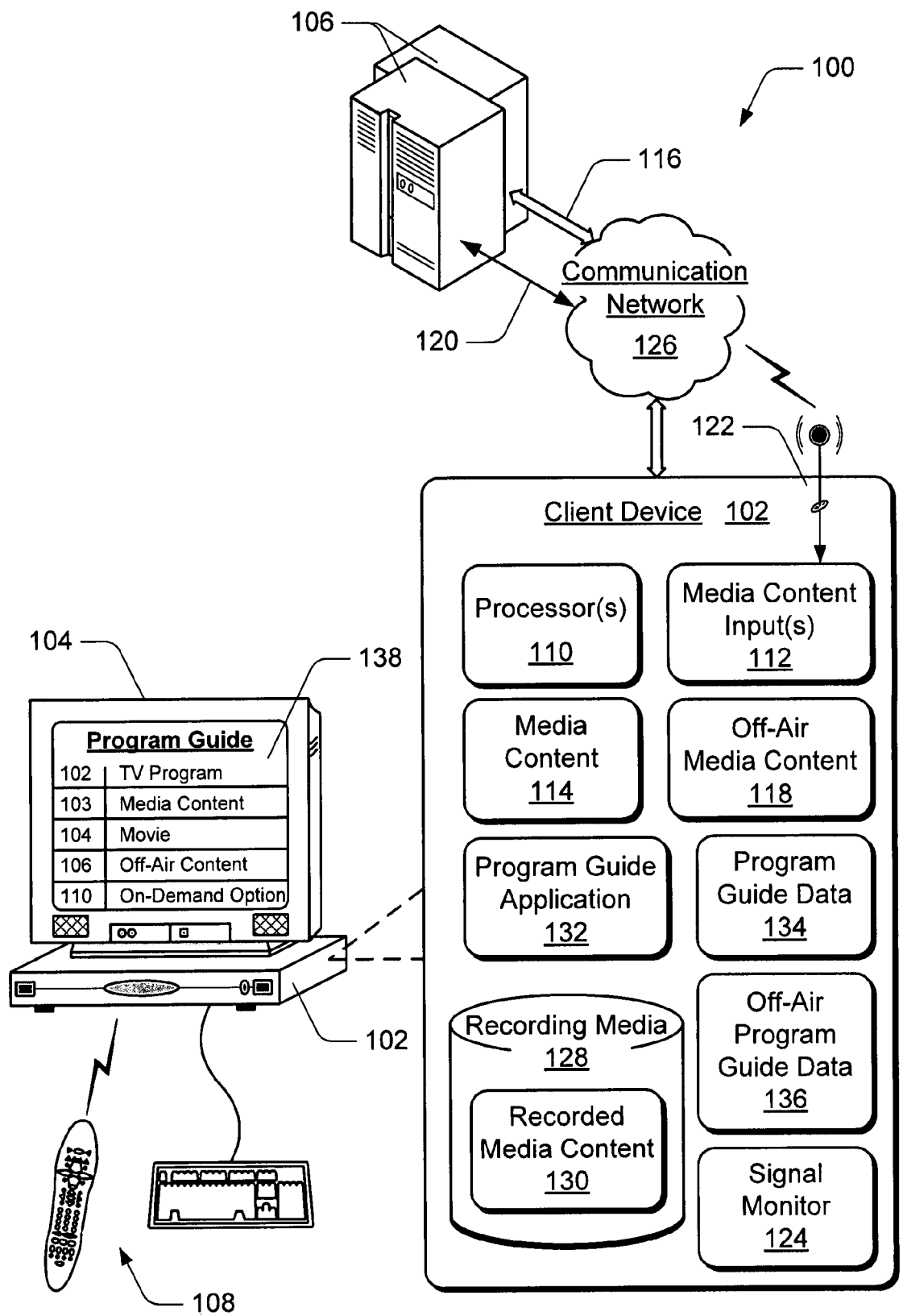
FIG. 1 illustrates an example system in which embodiments of data collection for a comprehensive program guide can be implemented.

FIG. 1 illustrates an example system 100 in which various embodiments of data collection for a comprehensive program guide can be implemented. In this example, system 100 includes a television client device 102, a display device 104, content distributor(s) 106, and input devices 108, such as a remote control device and/or a computer keyboard. The display device 104 can be implemented as any type of television, LCD, or similar television-based display system that renders audio, video, and/or image data. The client device 102 and display device 104 together are just one example of a television client system, examples of which are described with reference to the example entertainment and information system shown in FIG. 6.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example client device shown in FIG. 5.

In this example system 100, client device 102 includes one or more processor(s) 110, media content inputs 112, and media content 114. The media content inputs 112 can include any type of Internet Protocol (IP) inputs over which streams of media content (e.g., IPTV media content) are received via an IP-based network 116. The media content 114 can include IPTV media content or any other type of media content that is being received or has been received. In addition, the media content inputs 112 can include any type of broadcast and/or over-the-air inputs over which off-air media content 118 (e.g., television programming received over the air) is received via a broadcast network 120. In an embodiment, the off-air media content 118 is received via an "off-air" signal, also referred to as an "over-the-air" broadcast signal that can be received via an antenna system 122. The client device 102 can also include a signal monitor 124 that can measure various parameters of an off-air signal via which the off-air media content 118 is received, including signal strength and bit error rates.

The IP-based network 116 and the broadcast network 120 can be implemented as part of a communication network 126 that facilitates media content distribution and data communication between the content distributor(s) 106 and any number of client devices, such as client device 102. The communication network 126 can be implemented as part of a media content distribution system using any type of network topology and/or communication protocol, and can be represented or otherwise implemented as a combination of two or more networks. The television client device 102 is configured for communication with the content distributor(s) 106 via the communication network 126 to receive the media content 114 and/or the off-air media content 118.

Client device 102 also includes recording media 128 that maintains recorded media content 130. The recording media 128 along with a playback application can be implemented as a DVR (digital video recorder) system to record and maintain the recorded media content 130. The media content 114, off-air media content 118, and/or the recorded media content 130 can include television programs (or programming) which may be any form of programs, commercials, music, movies, and video on-demand media content. Other media content can include interactive games, network-based applications, music streamed from a computing device to the client device 102, as well as any other audio, video, and/or image content received from any type of media content source.

Client device 102 also includes a program guide application 132 that can be implemented as computer-executable instructions and executed by the processor(s) 110 to implement embodiments of data collection for a comprehensive program guide. The program guide application 132 processes program guide data 134 and/or off-air program guide data 136 from which a program guide 138 can be rendered and displayed for viewing on display device 104. A program guide is also commonly referred to as an electronic program guide or an "EPG". A viewer can navigate the program guide 138 utilizing an input device 108, such as the remote control.

The program guide data 134 corresponds to IPTV and/or on-demand media content, and can be received via the IP-based network 116. The off-air program guide data 136 corresponds to the off-air media content 118 and can be received over the air via the broadcast network 120 along with the off-air media content 118. In one or more embodiments, the client device 102 receives the off-air program guide data 136 which is then communicated to the content distributor(s) 106 via a two-way communication link of the IP-based network 116.

A content distributor 106 can receive the off-air program guide data 136 from the client device 102 and update a comprehensive program guide that includes program scheduling for IPTV, on-demand, and the off-air media content. The content distributor 106 can utilize the off-air program guide data 136 as the authoritative, up-to-date program guide data for the off-air media content 118 that is received at client device 102. From the off-air program guide data 136 received from several television client devices, the content distributor 106 can determine which of the client devices receive different regional channel lineups. Further, television client device 102 can resolve viewer-scheduled recordings that may conflict with a programming schedule change.

Figure 2:
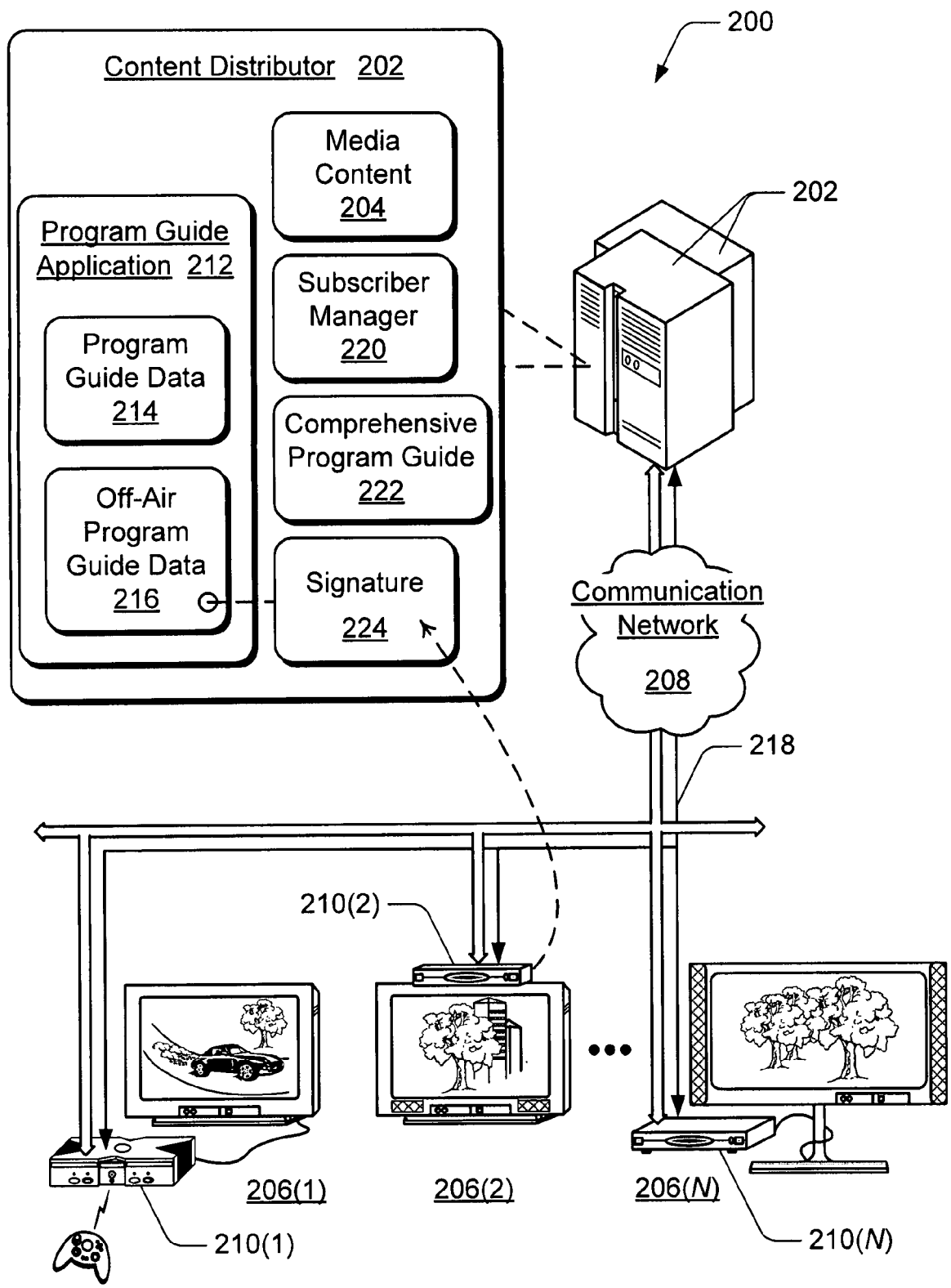
FIG. 2 illustrates another example system in which embodiments of data collection for a comprehensive program guide can be implemented.

FIG. 2 illustrates another example system 200 in which various embodiments of data collection for a comprehensive program guide can be implemented. The system 200 includes content distributor(s) 202 that communicate media content 204 to any number "N" of various television client systems 206(1-N) via a communication network 208. An example of a communication network is described with reference to communication network 126, and examples of client devices in television client systems are described with reference to television client device 102 as shown in FIG. 1. The communication network 208 can be implemented to include an IP-based network and a broadcast network that both facilitate media content distribution and data communication between the content distributor(s) 202 and any number of television client devices.

Each of the client systems 206(1-N) include a respective television client device 210(1-N) and a display device, such as any type of television, monitor, LCD, or similar television-based display system that renders audio, video, and/or image data. Any of the client devices 210(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. A television client device 210(1-N) may also be associated with a user (i.e., a person) and/or an entity that operates a client device such that a television client device describes logical clients that include users, software, and/or devices.

Any of the television client devices 210(1-N) of the respective client systems 206(1-N) can be implemented with one or more processors, a communication module, memory components, and a media content rendering system. Additionally, each of the television client devices 210(1-N) can be configured for communication with any number of different content distributors 202 to receive any type of media content via the communication network 208. Further, any of the television client devices 210(1-N) can be implemented with any number and combination of differing components as further described with reference to the example client device shown in FIG. 5.

In this example, a content distributor 202 includes a program guide application 212 having program guide data 214 and off-air program guide data 216. In an embodiment, the content distributor 202 receives the off-air program guide data 216 from any one or more of the television client devices 210(1-N) of the respective client systems 206(1-N). The off-air program guide data 216 reflects the broadcast television programming schedule for the off-air media content received at one or more particular client devices. A television client device 210 in the television media content system has all of the various program guide data aggregated and up-to-date.

The content distributor 202 can receive the off-air program guide data 216 from the client devices 210(1-N) via a two-way data communication link 218 of the communication network 208. It is contemplated that any one or more of the arrowed communication links 218 along with communication network 208 facilitate two-way data communication, such as from a client system 206(2) to a content distributor 202 and vice-versa.

In an embodiment, a television client device 210 can convert the off-air program guide data 216 to a data file format compatible with the content distributor 202. For example, all of the client devices 210(1-N) can convert the off-air program guide data 216 to a common global listings format (GLF) for transferring program guide data before communicating the data to the content distributor 202.

The off-air program guide data 216 can include a Network Information table (NIT) that contains details of all off-air signals, Service Description Tables (SDT) that contain the channel lineup for a given off-air signal, and Event Information Tables (EIT) that contain the details of the programming on a channel-by-channel basis. The content distributor 202 can receive the details of off-air signals (i.e. the NIT), the corresponding channel lineups (i.e., the SDT), and the corresponding programming information (i.e., the EIT) from the television client devices 210(1-N).

A content distributor 202 can include a subscriber manager 220 that is a Customer Relationship Management (CRM) system for each of the television client systems 206(1-N). The subscriber manager 220 can record information such as the postal code for each television client system 206, as well as record and track the off-air data signal characteristics of the data signals received at each of the television client systems 206(1-N). A content distributor 202 can utilize the off-air program guide data 216 received from a television client device 210 to create an accurate comprehensive program guide 222 that includes all local variations of off-air media content scheduling. In an embodiment, the comprehensive program guide 222 can be created using known locations of the television client devices 210(1-N) obtained from the postal codes information maintained by the subscriber manager 220.

The content distributor 202 can use the off-air program guide data 216 as the authoritative, up-to-date program guide data for the off-air media content received at the client devices 210(1-N). The comprehensive program guide 222 can include program scheduling for IPTV, on-demand, and off-air media content. In an embodiment, the content distributor 202 can then communicate the up-to-date comprehensive program guide 222 to any one or more of the client devices 210(1-N) that are within a broadcast region receiving off-air media content. Additionally, the content distributor 202 can resolve viewer-scheduled recordings that may conflict with a programming schedule change. Further, the content distributor 202 will be up-to-date if receiving a media content search request from a client device 210.

The population of client devices 210(1-N) is used in example system 200 to gather the off-air program guide data 216 which is then reconciled and aggregated at the content distributor 202 (e.g., a "headend"). In an embodiment, the comprehensive program guide 222 does not need to be communicated back to the client devices 210(1-N) because each client device already has the off-air program guide data corresponding to the off-air media content that is received at each of the client devices. For example, television client device 102 described with reference to FIG. 1 receives the off-air program guide data 136 that corresponds to the off-air media content 118 which is received over the air at client device 102.

A program guide application of a client device 210(2) (such as program guide application 132 shown in FIG. 1) can generate a signature 224 from the off-air program guide data 216. The signature 224 of the off-air program guide data 216 uniquely identifies a version of the program guide data when received at a client device 210(2) along with the off-air media content. A signature can be a checksum and/or a timestamp of the off-air program guide data that is received. For example, content distributor 202 may receive a signature "X" having a timestamp "Y" to differentiate between variations in off-air program guide data 216 received from the client devices 210(1-N).

A content distributor 202 can maintain an association of signatures and corresponding off-air program guide data 216 received from any number of the client devices 210(1-N). The content distributor 202 can determine a list of unique signatures which reflect the different channel lineups received across the entire population of television client devices 210 (1-N). The content distributor 202 can then randomly select one "peer client device" from each set of client devices with a given signature from which to receive updates.

For example, program guide application 212 at content distributor 202 can select one client device 210(2) from a group of the client devices 210(1-N) that all have the same signature generated from the off-air program guide data. The television client devices in a particular broadcast region receive the same off-air media content and corresponding off-air program guide data. The content distributor 202 only needs to receive the off-air program guide data 216 from one of the television client devices 210(2) in the group. The content distributor 202 can then receive updated program guide data and an updated signature generated from the updated program guide data from the selected television client device 210(2) of the group.

The selected television client device 210(2) can periodically communicate a "keep alive" signal to the content distributor 202 and an update of the off-air program guide data when received at the client device 210(2). Alternatively, or in addition, the content distributor 202 can periodically request an update of the off-air program guide data from the selected television client device 210(2). In an event that client device 210(2) is not available to provide the updated off-air program guide data, the content distributor 202 can select a different client device from the group of client devices 210(1-N) to provide the updated off-air program guide data.

The client devices 210(1-N) may each receive a variation, or different, off-air media content depending on region and/or geographic broadcast differences. In an embodiment, the program guide application 212 can determine a geographical mapping of the client devices 210(1-N) based on the various off-air program guide data and/or the signatures that are generated from the off-air program guide data and received from the client devices.

The set of television client devices 210(1-N) with a given channel lineup signature provides an accurate indication of the services available to a consumer in a particular region, and can be used to identify and report areas of failure. This is an improvement over using the notional "postcode mapping" that is typically relied upon to predict what services might be available. Combined with signal strength information also recorded by the client devices 210(1-N) and tracked by the subscriber manager 220, a service coverage map can be determined. In another embodiment, the content distributor 202 can also use the tracked signal data from the subscriber manager 220 to determine geographic signal characteristics for the client devices 210(1-N). This also is an improvement over using predictions and algorithms to approximate regional signal characteristics.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example methods 300 and 400 described with reference to respective FIGS. 3 and 4 may be described in the general context of computer-executable instructions. Generally, computer-executable instructions can include applications, routines, programs, objects, components, data structures, procedures, modules, functions, and the like that perform particular functions or implement particular abstract data types. The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
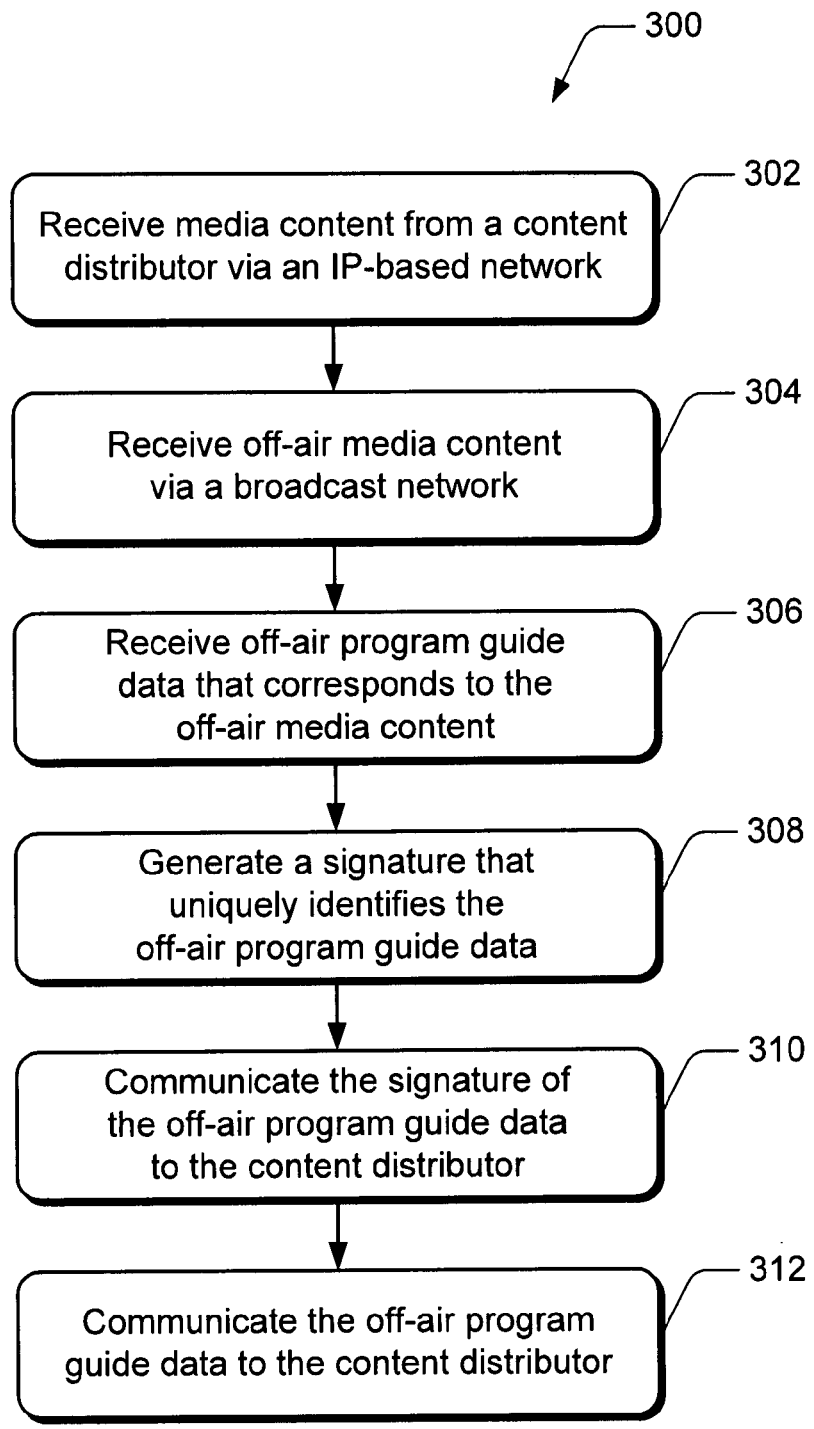
FIG. 3 illustrates example method(s) of data collection for a comprehensive program guide in accordance with one or more embodiments.

FIG. 3 illustrates example method(s) 300 of data collection for a comprehensive program guide, and is described with reference to television client device 102 shown in FIG. 1. The order in which the method is described is not intended to be construed as a limitation, and any number of the described method blocks can be combined in any order to implement the method, or an alternate method.

At block 302, media content is received from a content distributor via an IP-based network. For example, client device 102 receives media content 114 from a content distributor 106 via an IP-based network 116. At block 304, off-air media content is received via a broadcast network. For example, client device 102 can be implemented as a hybrid television set-top box that also receives off-air media content 118 via a broadcast network 120.

At block 306, off-air program guide data that corresponds to the off-air media content is received via the broadcast network. For example, client device 102 receives off-air program guide data 136 via the broadcast network 120 along with the off-air media content 118. At block 308, a signature that uniquely identifies a version of the off-air program guide data is generated from the off-air program guide data. For example, the program guide application 132 of client device 102 generates a signature from the received off-air program guide data 136 to uniquely identify a version of the program guide data.

At block 310, the signature that is generated from the off-air program guide data is communicated to the content distributor. At block 312, the off-air program guide data is also communicated to the content distributor. For example, the program guide application 132 of client device 102 initiates communicating the generated signature and the corresponding off-air program guide data 136 to the content distributor 106. In an embodiment, the client device 102 communicates the corresponding off-air program guide data 136 to the content distributor 106 upon receiving an indication from the content distributor that the signature is not a duplicate of a signature already received from another client device.

The method 300 can be repeated when client device 102 receives updated off-air program guide data (at block 306); generates a signature that uniquely identifies the updated off-air program guide data (at block 308); and communicates the updated signature and corresponding updated off-air program guide data to the content distributor 106 (at blocks 310-312).

Figure 4:
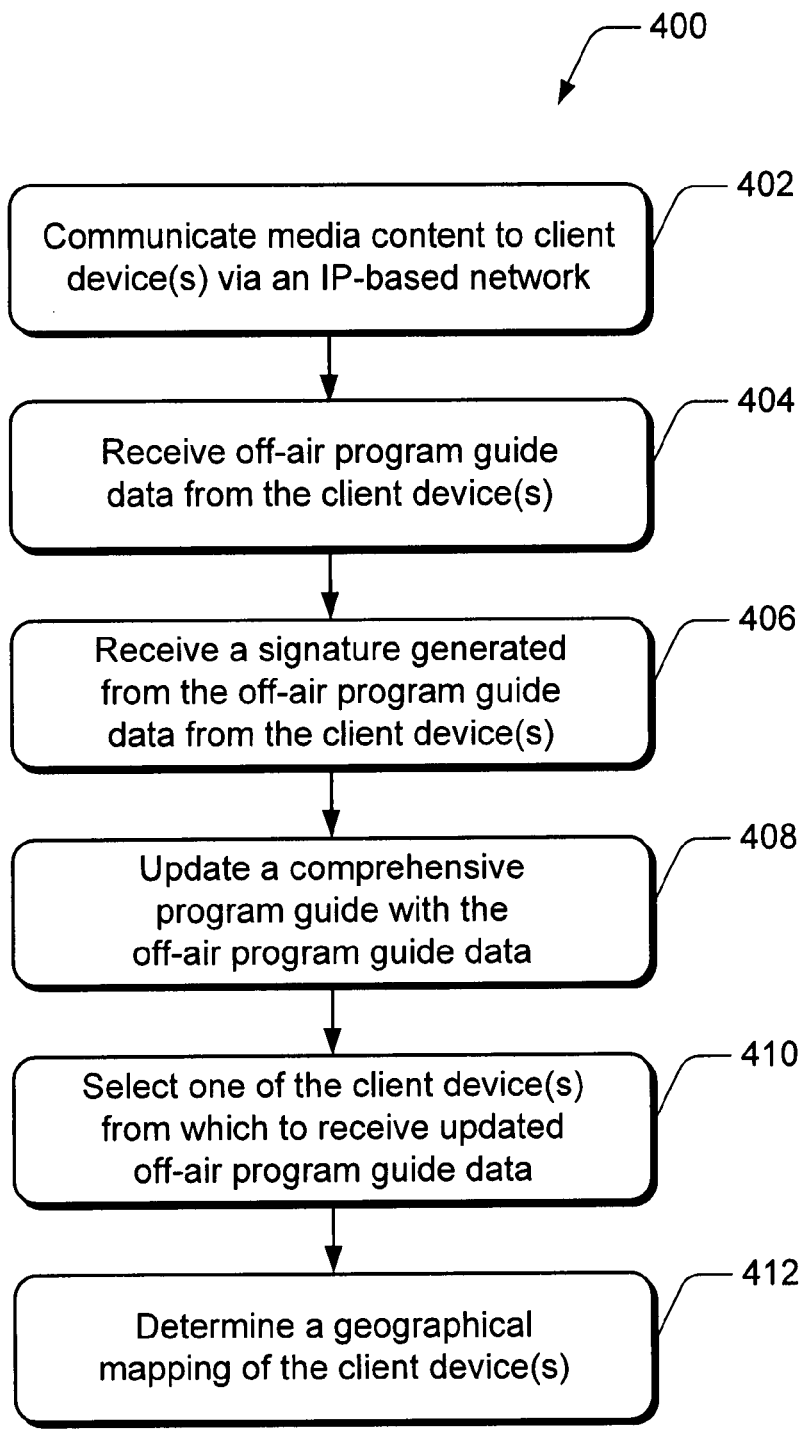
FIG. 4 illustrates example method(s) of data collection for a comprehensive program guide in accordance with one or more embodiments.

FIG. 4 illustrates example method(s) 400 of data collection for a comprehensive program guide, and is described with reference to content distributor 202 shown in FIG. 2. The order in which the method is described is not intended to be construed as a limitation, and any number of the described method blocks can be combined in any order to implement the method, or an alternate method.

At block 402, media content is communicated to one or more client devices via an IP-based communication network. For example, content distributor 202 communicates media content 204, such as IPTV media content, to television client devices 210(1-N) via communication network 208. At block 404, off-air program guide data is received from the one or more client devices. For example, content distributor 202 receives off-air program guide data 216 from any one or more of the client devices 210(1-N). The off-air program guide data 216 corresponds to off-air media content received by the client devices 210(1-N) via a broadcast network. For example, television client device 102 described with reference to FIG. 1 receives the off-air program guide data 136 that corresponds to the off-air media content 118 which is received over the air at client device 102.

At block 406, a signature generated from the off-air program guide data is received along with the off-air program guide data. For example, each of the client devices 210(1-N) generate a signature from the off-air program guide data to uniquely identifying a version of the program guide data. The client devices 210(1-N) then communicate the signatures to the content distributor 202 via the two-way data communication link 218.

At block 408, a comprehensive program guide is updated with the off-air program guide data that is received from a client device. For example, content distributor 202 updates the comprehensive program guide 222 with the off-air program guide data 216 received from one of the client devices 210(1-N). The comprehensive program guide 222 can be updated to include program scheduling for IPTV, on-demand, and the off-air media content. The comprehensive program guide 222 generated at the content provider is then up-to-date to reflect the off-air media content schedule at the television client devices 210(1-N).

At block 410, one of the client devices is selected from which to receive updated off-air program guide data. For example, the program guide application 212 of content distributor 202 selects one client device 210(2) from a group of client devices 210(1-N) that all have the same signature generated from the off-air program guide data 216. The selected client device 210(2) can then provide updated off-air program guide data corresponding to a schedule change of the off-air media content at the selected client device.

At block 412, a geographical mapping of the one or more client devices is determined. For example, the subscriber manager 220 of content distributor 202 determines a geographical mapping of the television client devices 210(1-N) based on postal codes and/or based on the off-air data signal characteristics of the data signals received at each of the television client systems 206(1-N). Alternatively, the subscriber manager 220 determines a geographical mapping of the client devices 210(1-N) based on the received off-air program guide data and/or based on the signatures generated from the off-air program guide data and received from the client devices 210(1-N).

Figure 5:
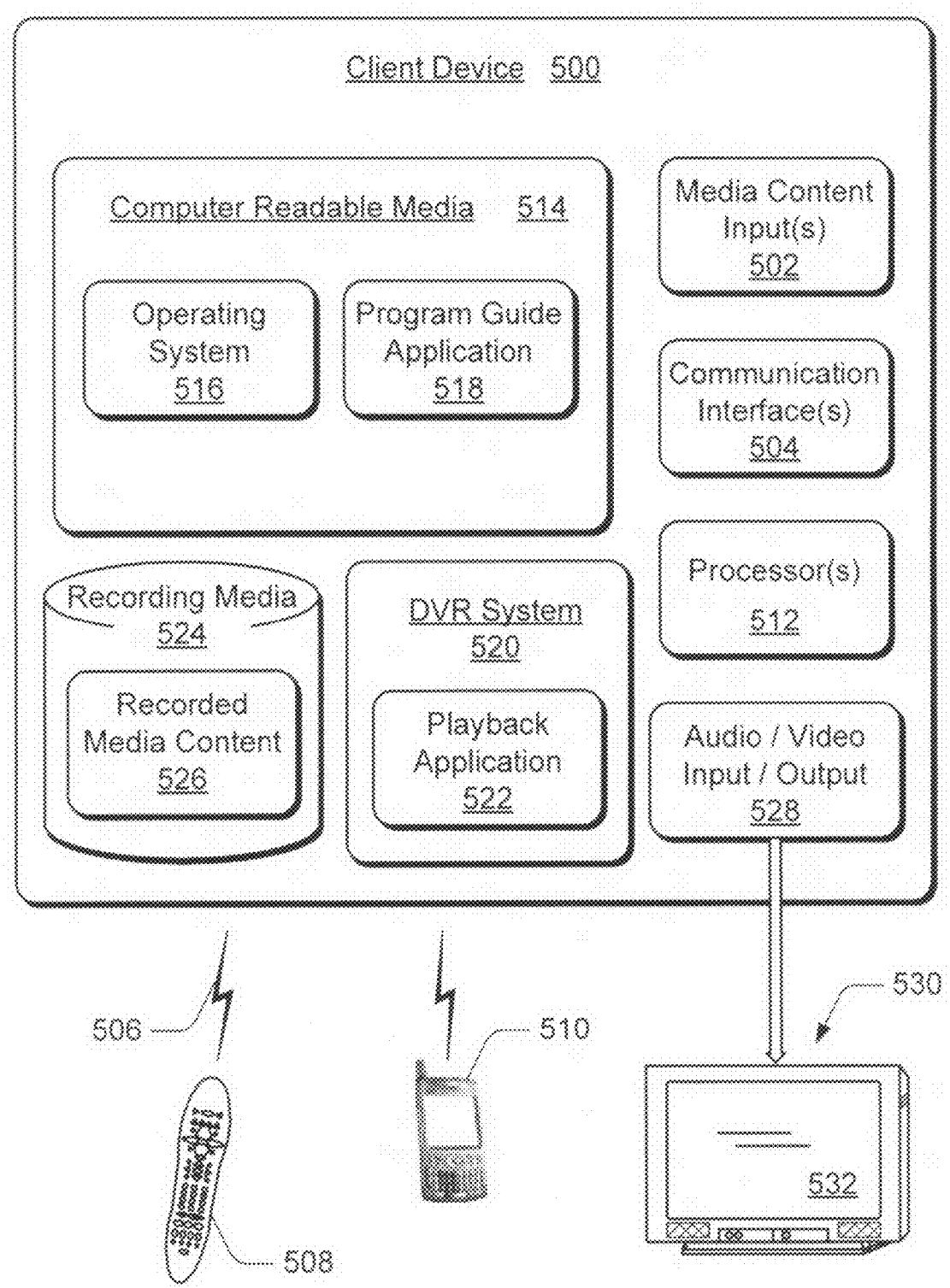
FIG. 5 illustrates various components of an example client device which can implement embodiments of data collection for a comprehensive program guide.

FIG. 5 illustrates various components of an example client device 500 that can be implemented as any form of a computing, electronic, or television client device to implement embodiments of data collection for a comprehensive program guide. For example, client device 500 can be implemented as client device 102 shown in FIG. 1, and/or as any of the client devices 210(1-N) of the client systems 206(1-N) shown in FIG. 2. In various embodiments, client device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 500 includes one or more media content inputs 502 that may include Internet Protocol (IP) inputs over which streams of media content are received via an IP-based network. The media content inputs 502 can also include over-the-air broadcast inputs via which off-air media content can be received along with corresponding signal reception characteristic data used to determine the strength and/or quality of the signal reception.

Client device 500 further includes communication interface(s) 504 that can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular phone) 510, or from another infrared (IR), 802.11, Bluetooth, or similar RF input device.

A network interface provides a connection between client device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Client device 500 also includes one or more processors 512 (e.g., any of microprocessors, controllers, and the like) which process various computer-executable instructions to control the operation of device 500, to communicate with other electronic and computing devices, and to implement embodiments of data collection for a comprehensive program guide. Client device 500 can be implemented with computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 514 provides data storage mechanisms to store various information and/or data such as software applications and any other types of information and data related to operational aspects of client device 500. For example, an operating system 516 and/or other application programs can be maintained as software applications with the computer-readable media 514 and executed on processor(s) 512 to implement embodiments of data collection for a comprehensive program guide.

Client device 500 can be implemented to include a program guide application 518 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer.

Client device 500 can also include a DVR system 520 with playback application 522, and recording media 524 to maintain recorded media content 526 that client device 500 receives and/or records. Further, client device 500 may access or receive additional recorded media content that is maintained with a remote data store (not shown), such as from a video-on-demand server, or media content that is maintained at a broadcast center or content distributor that distributes the media content to subscriber sites and client devices. The playback application 522 is a video control application that can be implemented to control the playback of media content, the recorded media content 526, and/or other video on-demand media content, music, and any other audio, video, and/or image media content which can be rendered and/or displayed for viewing.

Client device 500 also includes an audio and/or video output 528 that provides audio and/or video data to an audio rendering and/or display system 530. The audio rendering and/or display system 530 can include any devices that process, display, and/or otherwise render audio, video, and image data. Video signals and audio signals can be communicated from device 500 to a display device 532 via an RF (radio frequency) link, S-video link, composite video link, component video link, DVI (digital video interface), analog audio connection, or other similar communication link. Alternatively, the audio rendering and/or display system 530 can be implemented as integrated components of the example client device 500. Client device 500 along with the audio rendering and/or display system 530 is an example of a viewing system that can be implemented in a household viewing area for viewing television programs and/or receiving other television media content.

Figure 6:
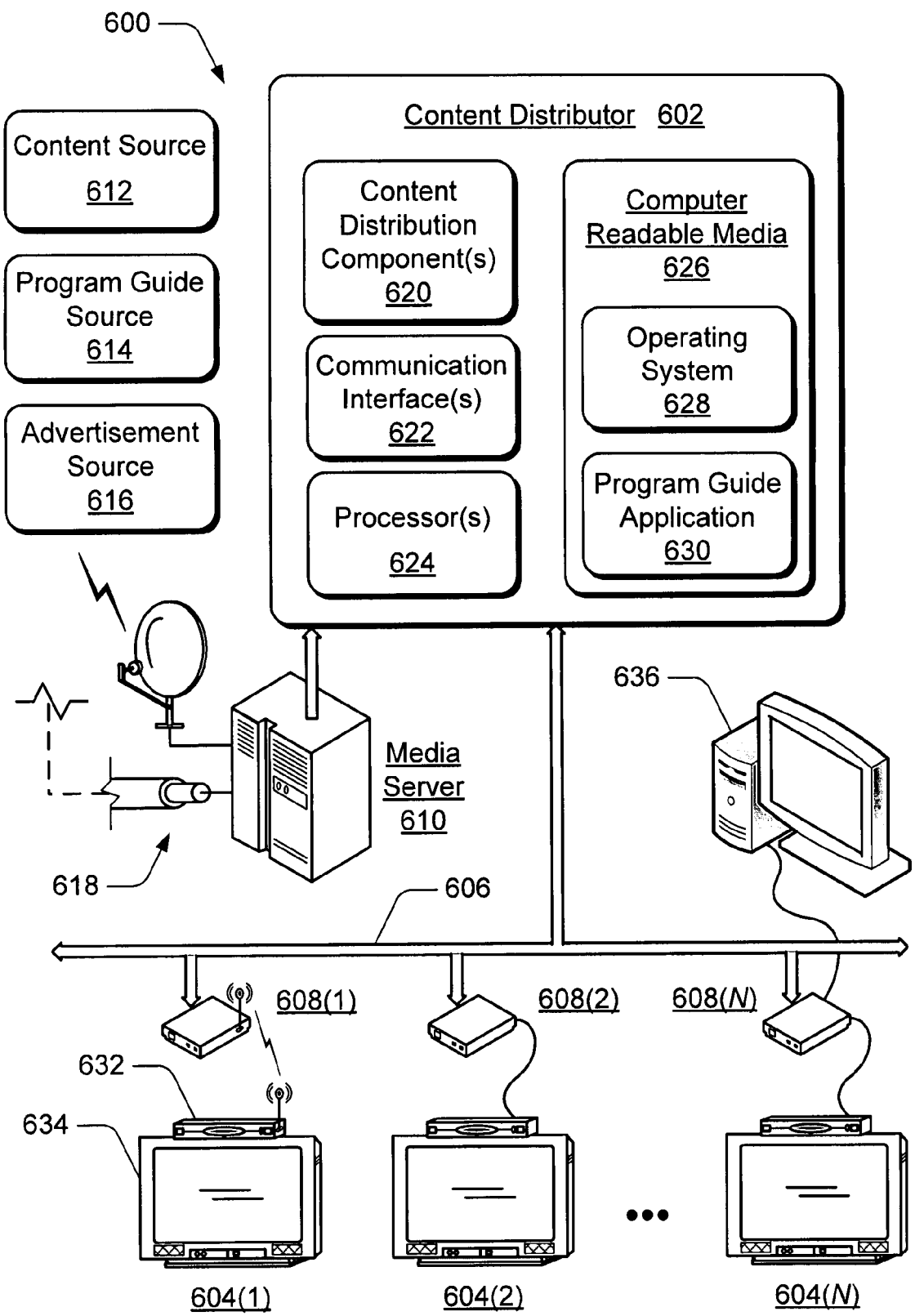
FIG. 6 illustrates various devices and components in an example entertainment and information system in which embodiments of data collection for a comprehensive program guide can be implemented.

FIG. 6 illustrates an example entertainment and information system 600 in which embodiments of data collection for a comprehensive program guide can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 206(1-N) described with reference to FIG. 2. Each of the client systems 604(1-N) can receive data streams of media content, program content, program guide data, advertising content, closed captions data, and the like from content server(s) of the content distributor 602 via the communication network 606. Additionally, each of the client systems 604(1-N) can receive off-air media content via a broadcast network.

The communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and the client systems 604(1-N).

System 600 includes a media server 610 that receives media content from a content source 612, program guide data from a program guide source 614, and advertising content from an advertisement source 616. In an embodiment, the media server 610 represents an acquisition server that receives the audio and video media content from content source 612, an EPG server that receives the program guide data from program guide source 614, and/or an advertising management server that receives the advertising content from the advertisement source 616.

The content source 612, the program guide source 614, and the advertisement source 616 control distribution of the media content, the program guide data, and the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the program content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604(1-N)). The content distributor 602 can be implemented as a satellite operator, a network television operator, a cable operator, and the like to control distribution of media content, program and advertising content, such as movies, television programs, commercials, music, and other audio, video, and/or image content to the client systems 604(1-N).

Content distributor 602 includes various content distribution components 620 to facilitate media content processing and distribution, such as a subscriber manager, a device monitor, and one or more content servers. The subscriber manager manages subscriber data, and the device monitor monitors the client systems 604(1-N) (e.g., and the subscribers), and maintains monitored client state information.

Although the various managers, servers, and monitors of content distributor 602 (to include the media server 610 in one embodiment) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of data collection for a comprehensive program guide.

The content distributor 602 includes communication interface(s) 622 that can be implemented as any type of interface to communicate and receive off-air program guide data from client devices of the television system. The content distributor 602 also includes one or more processors 624 (e.g., any of microprocessors, controllers, and the like) which process various computer-executable instructions to control the operation of content distributor 602. The content distributor 602 can be implemented with computer-readable media 626 which provides data storage to maintain software applications such as an operating system 628 and a program guide application 630. The program guide application 630 can implement one or more embodiments of data collection for a comprehensive program guide as described with reference to program guide application 212 shown in FIG. 2.

The client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. Additionally, any of the client devices 632 of a client system 604 can implement features and embodiments of data collection for a comprehensive program guide as described herein.

Although embodiments of data collection for a comprehensive program guide have been described in language specific to features and/or methods, is to be understood that the subject of the appended claims is not necessarily limited to the specific features or methods described. Rather, the specific features and methods are disclosed as example implementations of data collection for a comprehensive program guide.

The invention claimed is:

1. A method, comprising:
communicating media content to one or more client devices via an IP-based network;
receiving off-air program guide data from the one or more client devices, the off-air program guide data being previously received via a broadcast network by the one or more client devices and corresponding to off-air media content received via the broadcast network by the one or more client devices; and
updating a comprehensive program guide with the off-air program guide data that corresponds to the off-air media content.

2. A method as recited in claim 1, further comprising selecting one of the client devices from which to receive updated off-air program guide data that corresponds to a schedule change of the off-air media content.

3. A method as recited in claim 1, further comprising receiving a signature generated from the off-air program guide data that corresponds to the off-air media content, the signature uniquely identifying a version of the off-air program guide data.

4. A method as recited in claim 3, further comprising:
receiving an updated signature from a client device, the updated signature being generated from updated off-air program guide data received at the client device, the updated off-air program guide data corresponding to a schedule change of the off-air media content;
determining whether the updated signature is a duplicate of the signature already received from another client device; and
in an event that the updated signature is not a duplicate, receiving the updated off-air program guide data from the client device.

5. A method as recited in claim 3, further comprising selecting one client device from a group of the one or more client devices that all have the same signature generated from the off-air program guide data, the one client device selected to provide updated off-air program guide data that corresponds to a schedule change of the off-air media content.

6. A method as recited in claim 3, further comprising determining a geographical mapping of the one or more client devices based on the signatures generated from the off-air program guide data and received from the one or more client devices.

7. A method as recited in claim 1, further comprising determining a geographical mapping of the one or more client devices based on at least one of the off-air program guide data received from the one or more client devices, or postal code data corresponding to the one or more client devices.

8. A method as recited in claim 1, further comprising determining geographic signal characteristics for the one or more client devices from signal data received along with the off-air program guide data that corresponds to the off-air media content.

9. A content distributor, comprising:
a media content distribution system configured to deliver media content to one or more client devices via an IP-based network; and
a program guide application configured to:
receive off-air program guide data from the one or more client devices, the off-air program guide data being previously received via a broadcast network by the one or more client devices and corresponding to off-air media content received via the broadcast network by the one or more client devices; and
update a comprehensive program guide with the off-air program guide data that corresponds to the off-air media content.

10. A content distributor as recited in claim 9, wherein the program guide application is further configured to:
select one of the client devices from which to receive updated off-air program guide data; and
request the updated off-air program guide data that corresponds to updated off-air media content from the selected client device.

11. A content distributor as recited in claim 9, wherein the program guide application is further configured to receive a signature generated from the off-air program guide data, the signature uniquely identifying a version of the off-air program guide data received from a client device.

12. A content distributor as recited in claim 11, wherein the program guide application is further configured to select one client device from a group of the one or more client devices that all have the same signature generated from the off-air program guide data.

13. A content distributor as recited in claim 11, wherein the program guide application is further configured to:
receive an updated signature generated from updated off-air program guide data;
determine whether the updated signature is a duplicate of the signature already received from the client device; and
receive the updated off-air program guide data in an event that the updated signature is not a duplicate of the signature that was already received.

14. A content distributor as recited in claim 11, wherein the program guide application is further configured to determine a geographical mapping of the one or more client devices based on the signatures that are generated from the off-air program guide data and received from the one or more client devices.

15. A content distributor as recited in claim 9, wherein the program guide application is further configured to determine a geographical mapping of the one or more client devices based on the off-air program guide data received from the one or more client devices.

16. A content distributor as recited in claim 9, further comprising a signal monitor configured to determine geographic signal characteristics for the one or more client devices from signal data received along with the off-air program guide data that corresponds to the off-air media content.

17. A television client device, comprising:
a IP-based input configured to receive media content from a content distributor via an IP-based network;
an over-the-air input configured to receive off-air program guide data that corresponds to off-air media content received via a broadcast network; and
a program guide application configured to initiate communicating the off-air program guide data, previously received via a broadcast network, that corresponds to the off-air media content to the content distributor.

18. A television client device as recited in claim 17, wherein the program guide application is further configured to:
generate a signature from the off-air program guide data that corresponds to the off-air media content, the signature uniquely identifying a version of the off-air program guide data; and
initiate communicating the signature that is generated from the off-air program guide data to the content distributor.

19. A television client device as recited in claim 17, further comprising a signal monitor configured to monitor data signal characteristics received along with the off-air program guide data.

* * * * *